United States Patent [19]

Sims et al.

[11] 3,993,611

[45] Nov. 23, 1976

[54] ZINC CHLORIDE RESISTANT NYLON

[75] Inventors: Willard M. Sims, Leominster; Arthur D. Bliss, Harvard, both of Mass.

[73] Assignee: Foster Grant Co., Inc., Leominster, Mass.

[22] Filed: Apr. 17, 1975

[21] Appl. No.: 568,955

Related U.S. Application Data

[63] Continuation-in-part of Ser. No. 393,549, Aug. 31, 1973, abandoned, which is a continuation-in-part of Ser. No. 147,694, May 27, 1971, abandoned.

[52] U.S. Cl. ............................ 260/18 N; 260/78 A; 260/78 L; 260/78 R; 260/78 S
[51] Int. Cl.² ......................................... C08G 69/02
[58] Field of Search ............. 260/18 N, 78 A, 78 R, 260/78 L, 78 S; 264/232

[56] References Cited

UNITED STATES PATENTS

| | | | |
|---|---|---|---|
| 2,252,554 | 8/1941 | Carothers | 260/78 A |
| 2,950,269 | 8/1960 | Reppe et al. | 260/78 A |
| 3,240,732 | 3/1966 | Ham et al. | 260/18 N |
| 3,242,141 | 3/1966 | Vertnik et al. | 260/78 A |
| 3,393,163 | 7/1968 | Vertnik et al. | 260/18 N |

*Primary Examiner*—Eugene C. Rzucidlo
*Attorney, Agent, or Firm*—Hugh C. Crall

[57] ABSTRACT

New polymeric compositions having a resistance to zinc chloride are prepared by copolymerizing polyamide-producing monomers containing up to 9 carbon atoms in each molecule of monomer with a long chain hydrocarbon diacid and a long chain hydrocarbon diamine.

14 Claims, No Drawings

ZINC CHLORIDE RESISTANT NYLON

CROSS REFERENCE TO RELATED APPLICATIONS

This application is a continuation-in-part of our co-pending U.S. Patent Application Ser. No. 393,549 filed Aug. 31, 1973 now abandoned which is a continuation-in-part of U.S. Patent Application Ser. No. 147,694 filed May 27, 1971, now abandoned.

BACKGROUND OF THE INVENTION

This invention relates to long chain polyamides and more particularly to those polyamides generically known as nylon.

The excellent physical properties of these polyamides makes these compounds useful in manufacture of equipment and machinery parts. The automobile industry for example, has in the past few years, increased its use of parts made from polyamide-containing compositions because of their excellent wear resistance, tensile strength and resistance to corrosion or chemical attack.

Although polyamides generally have excellent corrosion or chemical attack resistance, the polyamides containing 9 or fewer in-chain carbon atoms between each repeating in-chain amide group are subject to stress cracking if they are mechanically stressed and exposed to an aqueous metallic halide solution. Zinc chloride has been found to be one of the more active halides with respect to stress cracking of such polyamides.

Experimentation has shown that polyamide compositions such as Nylon 11 containing at least 10 in-chain carbon atoms between each repeating in-chain amide group are not as sensitive to zinc chloride as are polyamides containing 9 or fewer in-chain carbon atoms between each repeating in-chain amide group. The polyamide materials such as Nylon 11 are quite expensive due to the lack of ready availability and the cost of the monomers from which they are prepared. It is desirable to find more suitable, less expensive substitutes having a resistance to attack by zinc chloride.

We have now discovered polyamide compositions that are adapted for use in industrial and consumer oriented components. Conventional molding, casting and extrusion process can be used in the fabrication of the polyamides of this invention. These polyamide compositions also have a resistance to attack by aqueous zinc chloride and other metallic halide solutions provided that the products of this invention are protected from moisture prior to exposure to the aqueous metallic halide solution.

The resistance of these polymers to attack by metallic halide solutions is useful in the manufacture of many articles of commerce e.g. pump impellers, piping, tubing, containers and machinery parts used in the transport of aqueous metallic halide solutions or under environmental conditions which would subject such parts to immersion in or contact with aqueous metallic halide solutions.

SUMMARY OF THE INVENTION

According to the invention, improved polyamide compositions are prepared by copolymerizing certain polyamide producing monomeric compounds with diamine-dicarboxylic acid compounds having the formula:

HOOCRCOOH·NH$_2$ R'NH$_2$ where R and R' are long chain saturated aliphatic hydrocarbon radicals. The improved polyamide compositions of the invention contain about 0.5 to about 15%, by weight of this diamine-dicarboxylic acid compound and in the preferred embodiment in an amount of about 1 – 10% by weight; said percentage based on the total weight of polyamide polymer in the composition. The saturated aliphatic hydrocarbon radicals designated above as R and R' contain about 25 to 50, and preferably about 30 to 40 carbon atoms.

DESCRIPTION OF THE INVENTION

The improved compositions of the invention are prepared from the class of polyamides known generically as nylon. This class includes all long chain polyamides having recurring amide groups as an integral part of the main polymer chain. These polymers are prepared by the condensation polymerization of amino acids or amino acid anhydrides, such as aminocaproic acid; lactams, such as epsilon-caprolactam; and salts of the reaction between diamines and dicarboxylic acids, such as the condensation product of the reaction between hexamethylene diamine and adipic acid.

The polyamide compounds which are generally susceptible to degradation or attack by aqueous metallic halide solutions are those polyamides having up to 9 in-chain, carbon atoms between each repeating in-chain, amide group in the polymer chain. Typical polymeric compounds of this class are poly (epsilon-aminocaproic acid) or polycaprolactam, commonly known as Nylon 6, poly (hexamethylene adipamide), commonly known as Nylon 6, 6 and poly (nonamethylene azeleamide), commonly known as Nylon 9, 9. Mixtures made from polyamide producing salts or monomers in which the diamine and diacid components containing different numbers of in-chain carbon atoms are within the scope of this invention. Poly (hexamethylene azeleamide), for example, is within the definition of the polyamides improved by this invention. Likewise, copolymers or blends prepared from two or more of the above materials are also contemplated as being among those polyamides improved by the invention.

In summary the compositions improved in accordance with our invention are those containing one or more polyamides having up to 9 in-chain carbon atoms separating the repeating amide groups in the polyamide chain. Polyamide-producing monomers are used in the claims of this application are those monomeric compounds which if polymerized form polyamides with 9 or less in-chain carbon atoms between the repeating amide groups in the polymer chain. Excluded from the compositions of this invention are those polymers which are comprised completely of polyamides containing more than 9 in-chain carbon atoms between each repeating amide group or which contain very substantial amounts of these polyamides, that is, amounts adequate to render the composition zinc chloride resistant without the use of the salts disclosed in the invention.

Aqueous zinc chloride solutions are particularly effective in the degradation or attack of such polyamides having less than 9 in-chain carbon atoms between repeating amide groups. The improved resistance to the attack of aqueous metallic halide solutions by the polyamides of this invention will be express in terms of resistance to attack by zinc chloride because its solutions are one of the more effective metallic halide solutions from the standpoint of causing such stress cracking.

Zinc chloride resistance or a resistance to attack by zinc chloride is determined in the context of this invention by preparing the improved copolymer compositions; fabricating the copolymers into a test specimen either a tensile bar prepared in accordance with ASTM D638 or into an extruded polyamide tubing specimen; subjecting the specimen to stress by bending it around a mandrel and immersing the stressed specimen in a 50% aqueous zinc chloride solution maintained at about 73° F. The specimen is examined for fracture and splitting while immersed in the zinc chloride solution.

It has been found that the products of this invention are more resistant to zinc chloride attack when the specimen has not been exposed to a high humidity environment for long periods of time prior to testing or use in an aqueous zinc chloride solution. If the products of this invention are exposed to a high humidity prior to immersion in the aqueous zinc chloride solution there may be a loss in resistance to attack depending upon the conditions of humidity and time of exposure. Exposure of the test specimens to a relative humidity of 100% for a two week period caused a loss of zinc chloride resistance. Therefore, in order to insure maximum zinc chloride resistance, the products of this invention should be packaged in a suitable moisture proof container or envelope immediately after fabrication if the fabricated part is to be stored for any length of time prior to use in an aqueous zinc chloride environment. We have found that a sealed polyethylene envelope is effective in preventing a loss of zinc chloride resistance due to exposure at atmospheric humidity. Surprisingly, immersion of the polymers of this invention into an aqueous solution of zinc chloride does not result in any loss of zinc chloride resistance due to contact with the aqueous environment.

The compositions which are used to improve the zinc chloride resistance of the above polyamide compositions are salts of long chain diamines and dicarboxylic acids. Each diamine and dicarboxylic acid molecule may contain about 25 to 50 and preferably about 30 to 40 carbon atoms. Accordingly, the salt produced when these diamines and dicarboxylic acids are reacted will have about 25 to 50 and preferably 30 to 40 carbon atoms between each reactive site (i.e: —COOH·NH$_2$—).

The diamines and dicarboxylic acids used in the invention can be prepared by any desired method and their preparation forms no part of the present invention. They can be conveniently prepared from long chain difunctional fatty materials which are obtained by dimerizing readily available unsaturated fatty acids containing about 12 to about 25 carbon atoms in the chain and having a double bond somewhere in the chain to facilitate dimerization. An example of such a material is oleic acid. It is not necessary that all of the carbon atoms in the compound be in-chain atoms, that is, some of the carbon atoms may be present as side groups attached to the main chain. These may occur when the double bond is not attached to the omega carbon atoms.

Although these salts may be prepared from specific diamines and diacids or mixtures of these it is usually more convenient to prepare them from naturally occuring unsaturated fatty oils. In the latter case the resulting compounds are mixtures of diamines and diacids of varying molecular weights due to the fact that the naturally occuring unsaturated fatty oils are themselves mixtures containing varying sized molecules. For the purpose of this discussion these compounds will hereinafter be referred to as dimerized salts. However, it is not to be inferred that these compounds can only be made from dimerized fatty oils.

The dimerized salts used in the invention can be prepared by reacting the selected hydrocarbon diamines and hydrocarbon diacids at a temperature below that at which the polymerization of the reactants will take place. This temperature can vary up to about 375° F. It is usually convenient to prepare the salts at room temperature, however, the mixture can be heated to speed up the reaction.

The dimerized salts may be present in the compositions of the invention in amounts of about 0.5 to about 15%, and preferably about 1 to about 10%, based on the total weight of polymer in the composition. These limits are not inflexible but generally, the benefits derived from the use of dimerized salts decrease as the concentration of salt in the composition drops below about 0.5% by weight. At the other extreme, it can be economically unfeasible to use amounts greatly in excess of about 15%, by weight due to the high cost of the dimerized salts.

The polymeric compositions of the invention are prepared by copolymerizing the polyamide producing monomer with the desired amount of dimerized salt. This can be accomplished by any of the well known methods for polymerizing polyamides and either continuous or batch processes may be employed. The dimerized salt can be added to the polymerization mixture either prior to or during the early stages of the polymerization. The mixture of polyamide-producing monomer and dimerized salt is heated sufficiently to raise the temperature to the polymerization temperature range, that is, to a temperature of about 375 — 550° F., and maintaining it at this temperature until the polymerization is substantially complete. The polymerized mixture is then cooled and the copolymer product is recovered.

In the alternative the diamine and dicarboxylic acid components having about 25 to 50 carbon atoms are added to the polyamide-producing monomer or polymerization mixture to form high molecular weight salts "in situ" and then the entire mixture is polymerized. The compositions of the invention cannot be satisfactorily prepared by the separate polymerization of the polyamide-producing monomer and the dimerized salt and the subsequent blending of the two polymerized materials. The dimerized salt does not, in general, polymerize to the extent that a solid polymer is obtained. This is due to the fact that the molecules of monomer are large and relatively immobile, hence the number of polymerization contacts are considerably reduced. The resulting polymer is a viscous, difficult to handle, liquid. Furthermore, it is desirable to obtain a uniform distribution of the dimerized salt in the final copolymer chain. This is best accomplished by adding the dimerized salt or its precursors to the polyamide-producing monomer prior to polymerization and copolymerizing the mixture.

Small amounts of other compounds which do not inhibit the polymerization to an undesirable degree may be incorporated into the monomeric mixture. Similarly compounds such as lubricants, plasticizers, fillers, reinforcing agents, anti-oxidants, dyes, etc., may be blended in the compositions of the invention, provided, of course, they are compatable with the polyamide composition. It is also contemplated that external lubricants may be used in molding or extruding the compositions of the invention, if so desired.

The following examples will better illustrate the invention. Parts and percentages are on a weight basis.

EXAMPLE I

A. Preparation of Dimerized Salt 224 grams of 1, 34-dicarboxytetratriacontane [HOOC-$CH_2$ - ($CH_2$) 32 ($CH_2$COOH] is dissolved in 800 mls. of methanol. In a second container 219 grams of 1, 36-diamino-hexatriacontane [$H_2$ N$CH_2$ ($CH_2$)$_{34}$$CH_2$N$H_2$] is dissolved in 200 mls. of methanol. The diamine-methanol solution is added dropwise to the diacid-methanol solution with continuous agitation at room temperature. The reaction is permitted to proceed for about one hour after all of the diamine is added to the diacid. The methanol is then removed by distillation yielding a pure diacid-diamine salt.

B. Polymerization

Five parts of the salt prepared in Part A is dissolved in 95 parts of molten caprolactam in a polymerization rector. The reactor is sealed and heated to 485° F. and maintained there for about 4 hours at 30–35 psig. The reactor is depressurized and held at 485° F. overnight and it is swept continuously with nitrogen during the period. The resulting molten nylon polymer is extruded and pelletized.

Tensile specimens ⅛ inch in thickness and ½ inch in width are prepared in accordance with Type 1 ASTM D638. These specimens are bent around a mandrel of a radius of 2.09 inches and immersed in a 50% aqueous zinc chloride solution maintained at about 73° F. The specimens are examined periodically. After 10 weeks the test specimens are removed and examined. They have no fractures and exhibit no visible attack from the zinc chloride.

Example I shows that articles molded from polycaprolactam compositions containing 5% dimerized salt have resistance to zinc chloride.

EXAMPLE II

Tensile specimens are made from polycaprolactam prepared in accordance with the precedure of Example I except that the polymerization mixture contains no dimerized salt. These specimens are bent around a mandrel as in Example I and immersed in a 50% aqueous zinc chloride solution which is maintained at 73° F. The samples fracture after three minutes and exhibit extensive splitting.

This Example illustrates that unmodified polycaprolactam is vulnerable to attack by zinc chloride.

EXAMPLE III

Tensile specimens are molded as in Example I from poly-(hexamethylene adipamide), sold under the trademark "Dupont Zytel 101". These specimens are bent around a mandrel as in Example I and immersed in a 50% aqueous zinc chloride solution maintained at 73° F. The specimens fracture after 17 minutes and upon inspection reveal extensive splitting.

This Example illustrates the fact that unmodified Nylon 6, 6 is vulnerable to attack by zinc chloride.

EXAMPLE IV

Tensile specimens are made as in Example I from a copolymer of 610 Nylon (sold under the trademark "Dupont Zytel 33"). These specimens are bent around a mandrel as in Example I and are immersed in a 50% aqueous zinc chloride solution maintained at 73° F. After 300 hours the specimens are removed and examined and found to contain no fractures. However they exhibit mild edge cracking.

This Example shows that Nylon 610 [that is poly (hexamethylene sebacamide)] has good zinc chloride resistance, although a slight vulnerability to zinc chloride is exhibited by this composition.

The above examples illustrate that Nylon 6 and Nylon 6, 6 are subject to severe attack by zinc chloride in aqueous solution. Zinc chloride resistance can be imparted to them by copolymerizing them with a small amount of a high molecular weight dimerized salt of the hydrocarbon diamines and the hydrocarbon dicarboxylic acids of this invention.

EXAMPLE V

A copolymer was prepared substantially in accordance with the procedure set forth in Example I. The resulting copolymer was recovered and extruded into a ⅛-inch diameter tubing. This tubing was packaged in a sealed polyethylene envelope prior to testing to prevent any degradative effects of the atmospheric humidity.

The tubing was wound around a ¾-inch mandrel and immersed in a 50% solution of zinc chloride. The ends of this tubing were extended above the test mandrel for a sufficient length to prevent aqueous zinc chloride from entering into the tubing. The ends of the tubing were left open to allow for the natural circulation of air through the interior portion of the test specimen. After 700 hours of testing, no stress cracking or craze marks had developed in the part.

This experiment shows that exposure to atmospheric humidity after immersion in zinc chloride has no detrimental effects on the zinc chloride resistance of the polyamides of this invention. The experiment demonstrates that the products of this invention would be suitable for use in products such as containers or piping in which metallic halide or zinc chloride solutions were transported.

A series of experiments were conducted and the products tested for zinc chloride resistance substantially in accordance with the procedure used in Example I, except the amount and type of the comonomers was varied. In these examples products of this invention are compared with materials outside the scope of this invention. The following table summarizes the pertinent details of the experiments and test results:

TABLE I

| | Caprolactam Copolymers Zinc Chloride Resistance Test | | |
|---|---|---|---|
| Experiment | Comonomers | Comonomer Weight % | Zinc Chloride Resistance |
| VI | (1) Dimer Acid*-Dimer Diamine** | 5 | 200 hours No stress cracks |
| VII | (2) Aminoundecanoic Acid | 20 | 24 hours |

TABLE I-continued

Caprolactam Copolymers
Zinc Chloride Resistance Test

| Experiment | Comonomers | Comonomer Weight % | Zinc Chloride Resistance |
|---|---|---|---|
| VIII | (2) Dimer Acid*-Dodecane Diamine | 5 | Stress cracks 36 hours |
| IX | (2) Dimer Acid*-Dodecane Diamine | 15 | Stress cracks 200 hours No stress cracks |

*Dimer Acid - 1,34-dicarboxytetratriacontane
**Dimer Diamine - 1,36-diaminohexatriacontane
(1) product of this invention
(2) product outside the scope of this invention These examples show that the products of this invention are at least three times more resistant to zinc chloride attack than the products of the prior art, i.e., dodecane diamine copolymer.

Additional ⅛-inch specimens of the above identified copolymers of Experiments VI, VII, VIII and IX were conditioned over water in an atmosphere of 100% humidity for various periods of time before immersion in the zinc chloride solution and the above identified zinc chloride resistance test was repeated. The results of these tests are as follows:

TABLE 2

Caprolactam Copolymer
Zinc Chloride Resistance Test - Conditioned Samples

| Experiment | Result after One Week Conditioning Time | Result after Two Weeks Conditioning Time |
|---|---|---|
| VI | 24 hours - stress cracks | 2 hours - stress cracks |
| VII | 48 hours - stress cracks | 24 hours - stress cracks |
| VIII | 36 hours - stress cracks | 36 hours - stress cracks |
| IX | 15 minutes - stress cracks | 200 hours - stress cracks |

The above results show the effect of atmospheric humidity on the zinc chloride resistance of these products and the necessity to avoid prolonged exposure to atmospheric humidity if maximum zinc chloride resistance is to be maintained.

Although the invention is described with particular reference to specific examples, it is understood that the scope of the invention is not limited thereto and that variations not inconsistent with the disclosure are contemplated. For example, as previously noted, the invention can be practiced with polyamides other than polycaprolactam without departing from the spirit of the invention. The scope of the invention is limited only by the breadth of the appended claims.

We claim:

1. A polyamide composition characterized by improved resistance to the stress cracking effect of an aqueous metallic halide solution; said composition comprising the product prepared by the process of copolymerizing a mixture of a saturated aliphatic diamine having the formula: $NH_2 - R' - NH_2$, a saturated aliphatic dicarboxylic acid having the formula $HOOC-R-COOH$, wherein said R' and R are saturated hydrocarbon radicals containing from about 25 to about 50 carbon atoms, said aliphatic diamine and said aliphatic dicarboxylic acid being present in approximately equal molar quantities in an amount of from about 0.5 percent to about 15 percent by weight and from about 85 percent to 99.5 percent by weight of a polyamide producing monomer, said polyamide producing monomer being selected from the group consisting of those amino acids, amino acid anhydrides, diamines, dicarboxylic acids, lactams and mixtures thereof having 9 or less in-chain carbon atoms; recovering said composition and then contacting said composition with said aqueous metallic halide solution without substantial exposure of said composition to atmospheric humidity prior to said contact whereby said composition will withstand immersion in a 50 percent by weight aqueous zinc chloride solution maintained at 73° F. for a period of 200 hours without appreciable stress cracking.

2. The polyamide composition of claim 1 wherein said aliphatic diamine and said aliphatic dicarboxylic acid are present in equal molar quantities in an amount of about 1 percent to about 10 percent by weight and from about 90 percent to about 99 percent by weight of said polyamide producing monomer.

3. The polyamide composition of claim 2 wherein said R' and R are saturated hydrocarbon radicals having from about 30 to 40 carbon atoms.

4. The polyamide composition of claim 2 wherein said polymide producing monomer is caprolactam.

5. The polyamide composition of claim 2 wherein said polyamide producing monomer is hexamethylene diamine and adipic acid.

6. The polyamide composition of claim 3 wherein said aliphatic diamine and said aliphatic dicarboxylic acid are present in equal molar quantities in an amount of about 5 percent to about 10 percent by weight and from about 90 percent to about 95 percent by weight of said polyamide producing monomer.

7. A polyamide composition of claim 4 wherein said aliphatic diamine and said aliphatic dicarboxylic acid are present in approximately equal molar quantities in an amount of about 5 percent to about 10 percent by weight and from about 90 percent to about 95 percent of said polyamide producing monomer.

8. A polyamide composition characterized by improved resistance to the stress cracking effect of an aqueous metallic halide solution; said composition comprising the product prepared by the process of copolymerizing a mixture of a saturated aliphatic diamine having the formula: $NH_2 - R' - NH_2$; a saturated aliphatic dicarboxylic acid having the formula $HOOC-R-COOH$, wherein said R' and R are saturated hydrocarbon radicals containing from about 25 to about 50 carbon atoms, said aliphatic diamine and said aliphatic dicarboxylic acid being present in approximately equal molar quantities in an amount of from about 0.5 percent to about 15 percent by weight and from about 85 percent to 99.5 percent by weight of a polyamide producing monomer, said polyamide producing monomer being selected from the group consisting of those amino acids, amino acid anhydrides, diamines, dicarboxylic acids, lactams and mixtures thereof having 9 or less in-chain carbon atoms; recovering said composition; maintaining said composition in an environment of low humidity and then contacting said composition with said aqueous metallic halide solution whereby said composition will withstand immersion in a 50 percent by weight aqueous zinc chloride solution maintained at 73° F. for a period of 200 hours without appreciable stress cracking.

9. The polyamide composition of claim 8 wherein said aliphatic diamine and said aliphatic dicarboxylic acid are present in equal molar quantities in an amount of about 1 percent to about 10 percent by weight and from about 90 percent to about 99 percent of said polyamide producing monomer.

10. A polyamide composition of claim 9 wherein said R' and R are saturated hydrocarbon radicals having from about 30 to 40 carbon atoms.

11. A polyamide composition of claim 9 wherein said polyamide producing monomer is caprolactam.

12. A polyamide composition of claim 9 wherein said polyamide producing monomer is hexamethylene diamine and adipic acid.

13. A polyamide composition of claim 10 wherein said aliphatic diamine and said aliphatic dicarboxylic acid are present in equal molar quantities in an amount of 5 percent to about 10 percent by weight and from about 90 percent to about 95 percent by weight of said polyamide producing monomer.

14. A polyamide composition of claim 11 wherein said aliphatic diamine and said aliphatic dicarboxylic acid are present in equal molar quantities in an amount of 5 percent to about 10 percent by weight and from about 90 percent to about 95 percent by weight of said polyamide producing monomer.

* * * * *